A. G. NEVILLE.
STEERING WHEEL LOCK MECHANISM.
APPLICATION FILED MAR. 18, 1916.
1,237,683.
Patented Aug. 21, 1917.
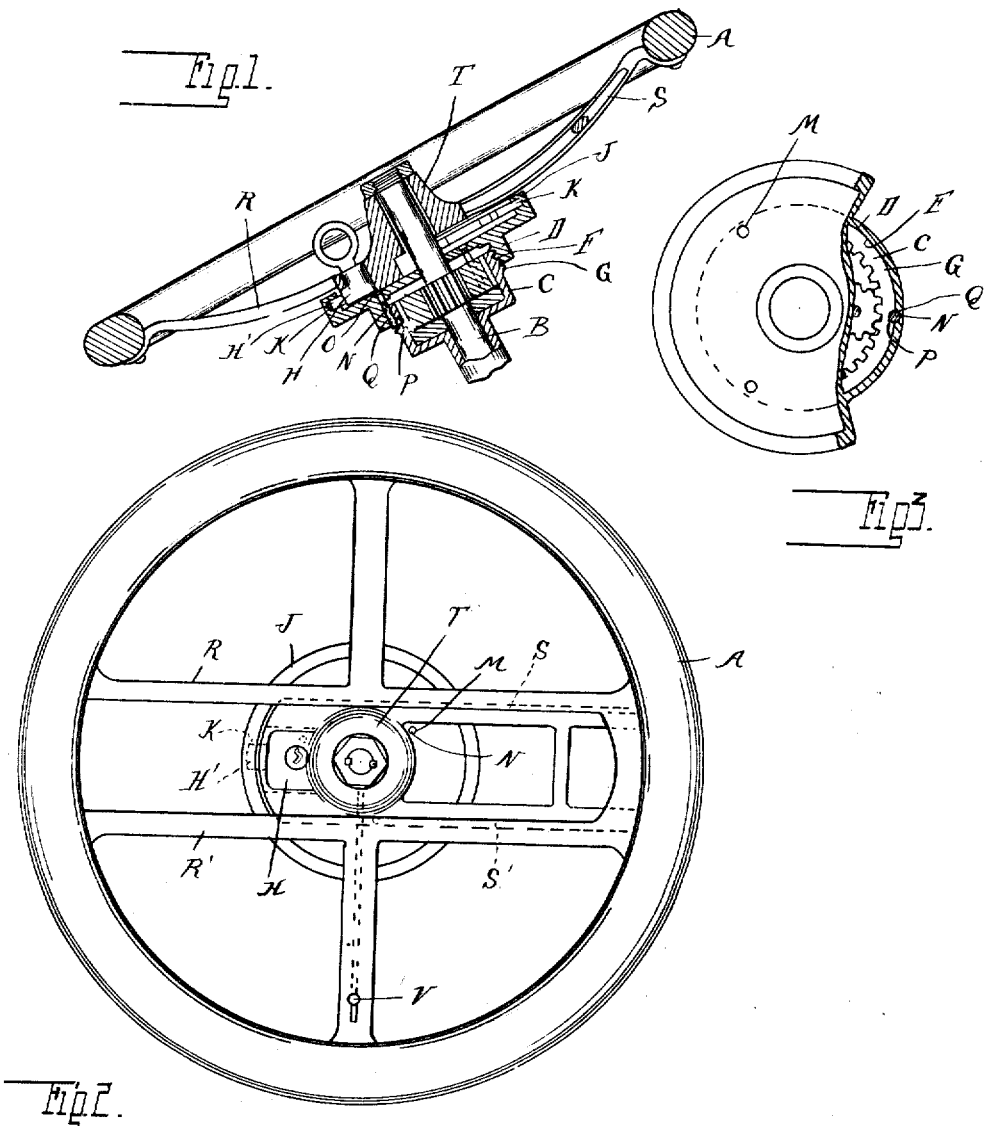
Inventor
Asa G. Neville
By Whittemore Hulbert & Whittemore
Attorneys

UNITED STATES PATENT OFFICE.

ASA G. NEVILLE, OF WELLSBURG, WEST VIRGINIA.

STEERING-WHEEL LOCK MECHANISM.

1,237,683.   Specification of Letters Patent.   Patented Aug. 21, 1917.

Application filed March 18, 1916. Serial No. 85,037.

*To all whom it may concern:*

Be it known that I, ASA G. NEVILLE, a citizen of the United States of America, residing at Wellsburg, in the county of Brooke and State of West Virginia, have invented certain new and useful Improvements in Steering-Wheel Lock Mechanism, of which the following is a specification, reference being had therein to the accompanying drawings.

This invention relates to devices for locking or otherwise rendering inoperative the steering mechanism of an automobile, boat, or other traveling device, the direction of travel of which is governed by a steering wheel, lever or other manually-actuated operating or controlling member.

In certain types of automobiles the steering wheel assembly has an internal gear case provided with a removable cap. This cap forms a very convenient abutment to which the steering wheel can be locked to hold the latter against rotation, but the ease with which the cap can be removed from the gear case has heretofore prevented the effective locking of the steering wheel, by parts interlocking with or connected to the gear case cap.

Among the salient objects of the present invention are to provide a construction of locking device in which the steering wheel is locked from rotation relative to the gear case cap and the latter also locked from removal from the gear case; to provide a construction in which the last-mentioned object is obtained without permanently securing the cap to the gear case; to provide a simple and efficient mechanism for locking the cap to the gear case and preventing its removal as long as the steering wheel is locked from rotation; to provide a construction of locking mechanism which can be employed with steering wheels of the type in which the wheel is slidable or otherwise movable to a position eccentric of the steering post; to provide a construction in which the device can be readily applied to steering mechanism of the general character above referred to by taking off the standard cap for the gear case and replacing it with a cap having coöperating parts of the locking mechanism; to provide a construction in which the steering wheel can be locked while in various positions of rotative adjustment; and in general to provide an improved and simplified construction by which the operator may instantaneously render inoperative the steering mechanism by which the direction of travel of the vehicle is governed.

The invention further resides in such features of construction and combination and arrangements of parts as will more fully hereinafter appear.

In the drawings:

Figure 1 is a sectional view showing a steering wheel embodying my invention;

Fig. 2 is a top plan view of the wheel;

Fig. 3 is a top plan view of the cap partly broken away.

Describing in detail the construction shown in the drawings, A designates the steering wheel, and B is the steering post adjusted by the turning of the steering wheel. In certain types of automobiles the steering wheel assembly includes a gear case C having the detachable cap D. The latter has screw threads F, engaging coöperating threads G on the exterior of the gear case. This cap forms a convenient abutment to which the steering wheel can be locked from rotation, but such locking is normally defective in preventing the theft of the car inasmuch as the wheel even when locked to the cap could be removed by unscrewing the cap from the gear case.

In the present construction I have provided a simple and efficient arrangement whereby the wheel is locked from rotation and the cap also locked from removal. The locking mechanism comprises a lock H having the bolt H' adapted to be adjusted into and out of locking engagement with keepers or recesses K formed in the periphery of a flange J on the cap member D. This cap member is provided with screw threads F so that it can be substituted for the cap member usually employed on cars of this type. It will be noticed that there is a plurality of recesses K, so that the steering wheel can be locked in various positions of rotative adjustments and the present invention contemplates a construction in which the locking mechanism for the cap also cannot be removed when the steering wheel is locked, irrespective of the position in which it is locked.

As shown in detail in Fig. 3, the cap D is provided with three apertures M which are located in the plane of the threaded portion. For locking the cap to the gear case I employ a plurality of pins N, which are preferably provided with heads O. When these bolts or pins N are driven through the apertures M they will cut grooves P in the threads F of the gear case and as they extend also into recesses Q in the threaded portion of the cap they will prevent the cap from being turned off the gear case.

The lock H is of sufficient area so that in any of the locking positions established by the recesses K it will extend over one of the pins and thus prevent the disengagement of the cap from the gear case. The employment of pins in this manner has the further advantage that while the cap is locked from removal whenever the steering wheel is locked. there is no permanent connection formed between the cap D and the gear case C and thus in case of adjustment or repair for the steering mechanism the cap can be disengaged in the usual manner after withdrawing the locking pins.

The locking mechanism above described is such that it can be conveniently employed with that type of steering wheels in which the wheel is slidable to a position eccentric of the steering post. In the present construction the spider supporting the wheel is provided with spaced arms R and R'. These arms have grooves S and S' within which the head T carrying the locking mechanism is slidable. The suitable latch member V serves to hold the wheel in its operative position while upon withdrawal of the latch member the wheel can be adjusted to one side of the post, thus giving additional room for the driver to enter or leave the vehicle. The device is not limited to use with this particular type of wheel, and while I have shown and described the invention as locking the steering wheel to the removal cap, in its broader aspect the invention is not limited to this particular use or in any manner except as specified in the appended claims.

What I claim as my invention is:—

1. The combination with a steering wheel and a steering post, of gears for actuating the post from the wheel, a gear case, a normally removable cap therefor, a lock for non-rotatively securing said wheel to said cap, and means for preventing removal of said cap when said wheel is locked from rotation.

2. The combination with a steering wheel and a steering post, of gears for actuating the post from the wheel, a gear case, a cap having screw threaded engagement with said case, a pin extending into the threaded portion of said case and cap for locking the latter from removal, and a lock for non-rotatively securing the steering wheel to said cap, said lock extending over said pin when in locked position and preventing removal thereof.

3. The combination with a steering wheel and a steering post, of gears for actuating the post from the wheel, a gear case, a cap having screw threaded engagement with said case, a plurality of removable pins extending through the threaded portion of the cap and gear case, and a lock for non-rotatively securing the steering wheel to the cap, having a plurality of locking positions corresponding to various positions of rotative adjustment of the wheel, said lock in each of its operative positions preventing removal of one of said pins.

4. The combination with a steering wheel and a steering post, of gears for actuating the post from the wheel, a gear case, a cap for said gear case rotatively removable therefrom, a pin interengaging said cap and gear case to prevent removal of the cap, of means for interlocking the wheel and said cap in a position preventing access to said pin.

5. The combination with a steering wheel and a steering post, of gears for actuating the post from the wheel, a gear case, a normally removable cap for said gear case, a removable member engaging said cap with the gear case, and a common means for locking said wheel to said cap and for preventing access to said removable member.

In testimony whereof I affix my signature.

ASA G. NEVILLE.